No. 708,440. Patented Sept. 2, 1902.
E. A. WHITEHEAD.
DISTANCE RECORDING APPARATUS FOR RECIPROCATING BODIES.
(Application filed Nov. 11, 1901.)

(No Model.) 3 Sheets—Sheet 1.

Witnesses
Chas H. Smith
J. Staib

Inventor
Edwin A. Whitehead
per L. W. Terrell & Son
atty.

No. 708,440. Patented Sept. 2, 1902.
E. A. WHITEHEAD.
DISTANCE RECORDING APPARATUS FOR RECIPROCATING BODIES.
(Application filed Nov. 11, 1901.)
(No Model.) 3 Sheets—Sheet 3.

Witnesses
Chas. H. Smith
J. Staib

Inventor
Edwin A. Whitehead
for L. W. Serrell & Son
atty.

UNITED STATES PATENT OFFICE.

EDWIN ATKINSON WHITEHEAD, OF BROKEN HILL, NEW SOUTH WALES, AUSTRALIA.

DISTANCE-RECORDING APPARATUS FOR RECIPROCATING BODIES.

SPECIFICATION forming part of Letters Patent No. 708,440, dated September 2, 1902.

Application filed November 11, 1901. Serial No. 81,800. (No model.)

*To all whom it may concern:*

Be it known that I, EDWIN ATKINSON WHITEHEAD, a subject of the King of Great Britain, residing at Wolfram street, Broken Hill, in the State of New South Wales, Australia, have invented certain new and useful Improvements in Distance-Recording Apparatus for Reciprocating Bodies, of which the following is a specification.

The object of my invention is to provide means for recording, preferably in feet and inches, upon a counter or register the sum of the travels of the reciprocating parts of duplex pumping or other engines.

It consists, essentially, in a frame, a shaft and bearings therefor in said frame, wheels on said shaft, means in connection with the reciprocating bodies whereby said wheels are rotated, a gear-wheel free on said shaft, and an epicyclic train of gears whereby motion is transmitted from the said wheels to the said gear-wheel, so that the resultant motion of said gear-wheel is proportional in a given time to the sum of the travels of the said reciprocating parts in the same time.

In order that the invention may be readily understood, reference will be made to the accompanying drawings, in which—

Figure 1:
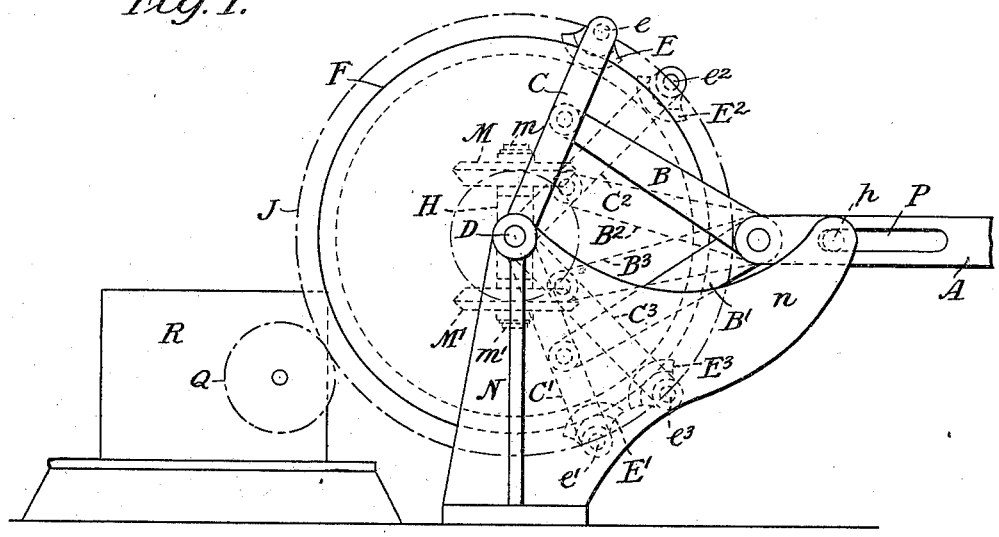
Figure 2:
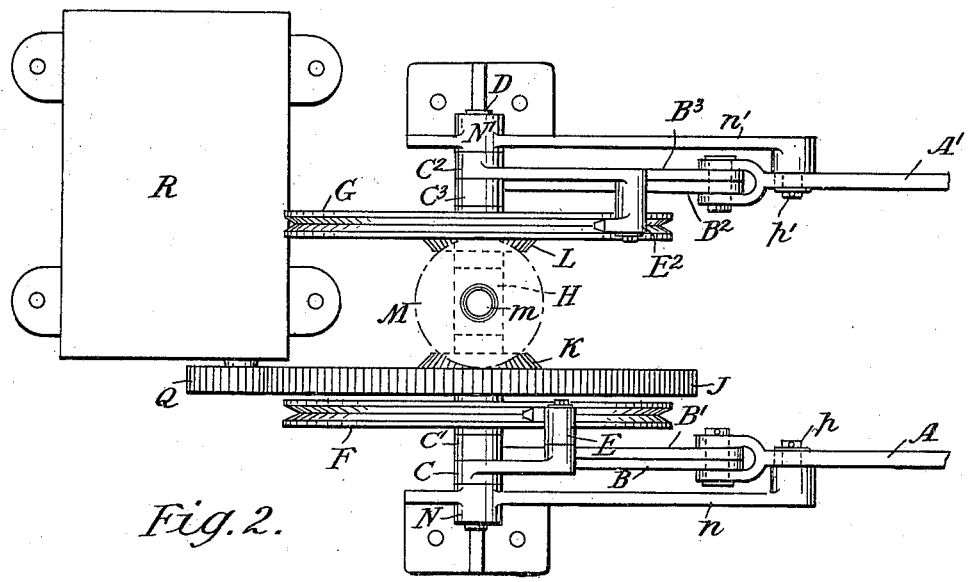
Figure 3:
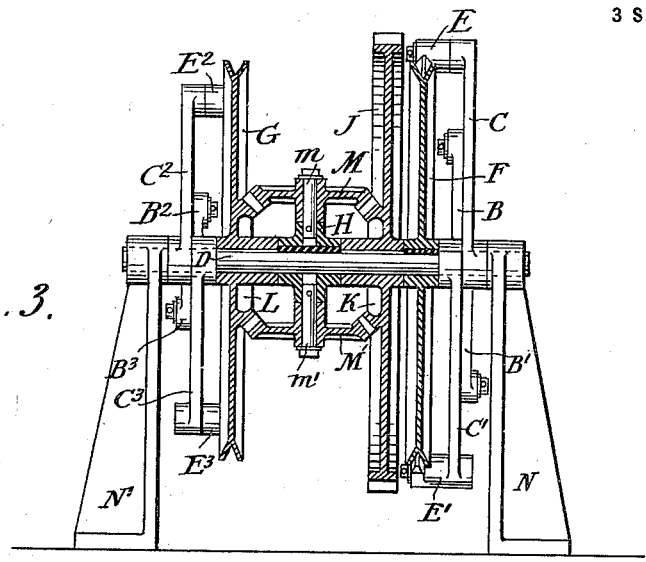
Figure 4:
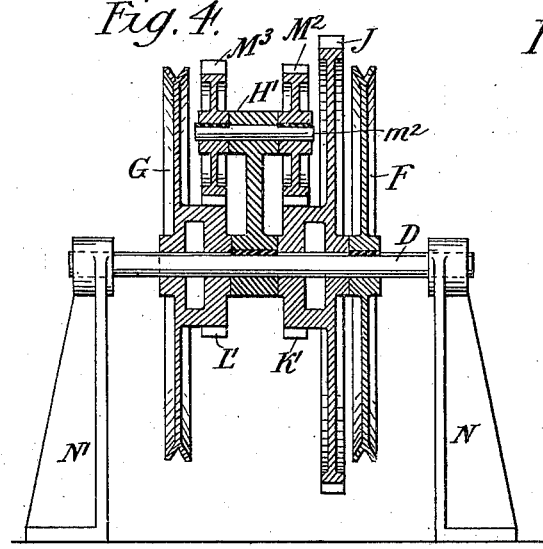
Figure 7:
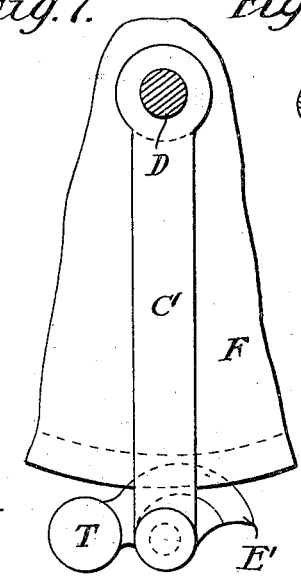
Figure 8:
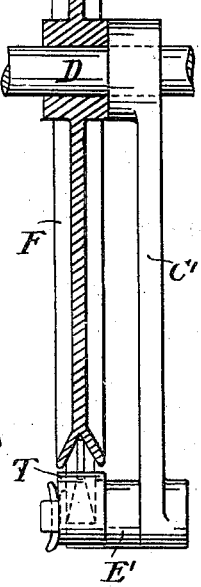
Figure 11:
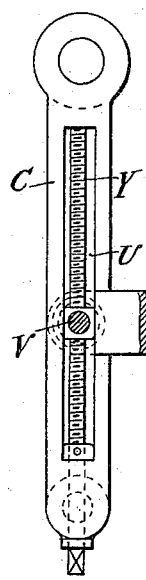
Figure 12:
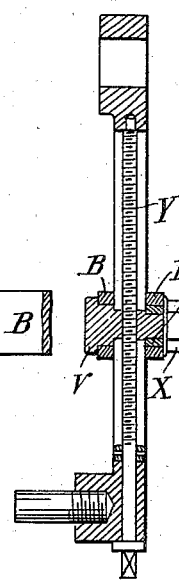
Figure 13:
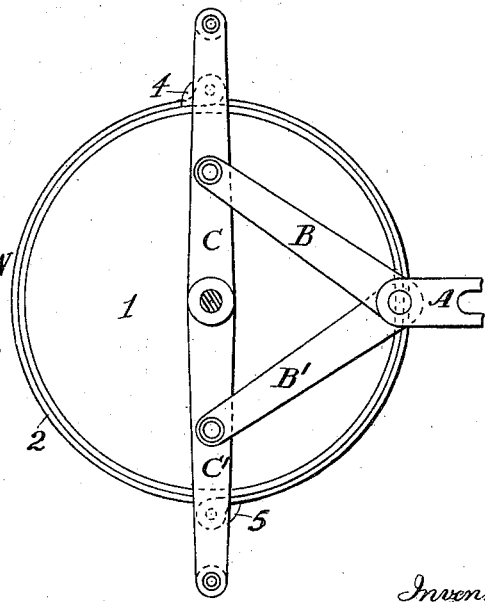
Figure 14:
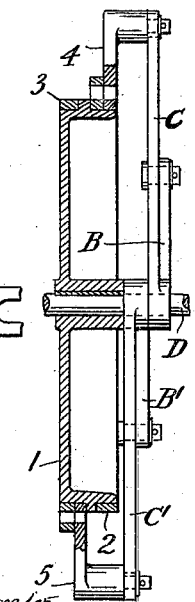

Figure 1 shows a side view of a general arrangement of the apparatus. Fig. 2 shows a plan of the same. Fig. 3 shows a section through one arrangement of the epicyclic train. Fig. 4 shows a modified arrangement of the epicyclic train. Figs. 5, 6, 7, 8, 9, 10, 11, and 12 are enlarged details of portions of the driving mechanism. Figs. 13 and 14 show a modified arrangement of "continuous-feed" driving mechanism.

The same letters and figures of reference are employed throughout the specification to indicate corresponding parts.

Referring to Figs. 1, 2, and 3, A and A' are rods deriving motion from the pistons of the engine, A being moved by one piston and A' by the other. Hinged to one end of A are the links B and B', and to the corresponding end of A' the links $B^2$ and $B^3$. The links B B' $B^2$ $B^3$ are hinged and communicate motion to the rocking levers C C' $C^2$ $C^3$, respectively, which are supported by and free to oscillate about the shaft or spindle D. The outer ends of the said rocking levers carry the eccentric wedges E E' $E^2$ $E^3$, free to move or oscillate upon their pins $e$ $e'$ $e^2$ $e^3$ and having their edges shaped to fit in the grooves in the wheels F and G. E and E' engage with the wheel F and $E^2$ and $E^3$ engage with the wheel G. The grooved wheel F is keyed upon or otherwise secured to the shaft D. The grooved wheel G rides loose upon it. Also upon the shaft D is the arm or hub H, which is keyed or otherwise secured, and the toothed wheel J, which is free or loose. Attached to the toothed wheel J is the miter-wheel K, and attached to the grooved wheel G is the miter-wheel L. Carried by the arm or hub H are the miter-wheels M and M', free to revolve upon their respective pins $m$ $m'$ or axes and gearing with and capable of driving or being driven by the miter-wheels K and L. The shaft D is supported in suitable bearings in frames N and N'. The rods A and A' are constrained to move in approximate straight lines by the guide-slots P and P', and the pins $p$ $p'$ on the arms $n$ $n'$ of frames N N'. Gearing with the wheel J is the wheel or pinion Q, secured upon the driving-shaft of the recorder R.

The action of the apparatus is as follows: If the grooved wheel F, and with it the hub H, be held from revolving and motion be imparted to the grooved wheel G, and with it the wheel L, then M and M' will act as intermediate wheels only and will impart the same amount of motion, but in reversed direction, to the wheel K, and with it the wheel J, to which it is attached. Again, if the grooved wheel G, and with it the wheel L, be held from revolving and motion be imparted to the grooved wheel F, and consequently to the hub H also, then for each revolution of the wheel F the wheel J will make two revolutions in the same direction as F, one revolution being due to the wheel K being carried around by wheels M and M' as they revolve with the hub H and the other revolution being due to the revolution of M and M' on their respective pins or axes as they are carried around the dead-wheel L. In order that the wheel J shall always rotate in one direction, it is arranged that the grooved wheels F and G shall be caused to revolve in opposite directions, and in order that the wheel J shall receive equal amounts of motion from each of the grooved wheels F and G it is arranged that the wheel F shall have imparted to it only one-half as much motion as is imparted to the wheel G. Now if the wheel G be moved through one revolution in one direction and the wheel F be moved through half a revolution in the opposite direction and at the same time, then the wheel J will make two revolutions in the same direction as the wheel F, one revolution being due to the motion of the wheel F and the other revolution being due to the motion of the wheel G. Motion is imparted to the grooved wheels F and G by the bars A and A', the links B B' B² B³, the rocking levers C C' C² C³, and the eccentric wedges E E' E² E³, the bar A actuating E E' and the the grooved wheel F and the bar A' actuating E² E³ and the grooved wheel G. The eccentric wedge engaging the grooved wheel being the equivalent of a click and a ratchet with an infinite number of teeth, whatever amount of motion may be imparted to the eccentric wedge will be imparted also to the grooved wheel. The eccentric wedges E E' being set in the same direction on opposite sides of the center of the grooved wheel F will engage the wheel alternately and will cause the wheel to rotate in one direction only, whether the bar A be moving backward or forward. In the same way the eccentric wedges E² E³ drive the grooved wheel G; but they are set to drive it in the opposite direction to wheel F. If the travels or strokes of the bars A and A' be equal, then the links B B' are hinged to the rocking levers C C' and the links B² B³ to the rocking levers C² C³ in such positions that the rocking levers C C' will oscillate through only one-half of the distance oscillated by the rocking levers C² C³, and consequently the grooved wheel F will move through only half the distance moved by the grooved wheel G. It follows, therefore, that the movement of the wheel J will be proportionate to the sum of the travels or strokes of the bars A A', and consequently it is only necessary to correctly proportion the wheel Q to the wheel J to cause the recorder R to record the sum of the actual distances traveled through by the pistons actuating the bars A and A'. If, however, the travels or strokes of the bars A and A' be unequal, the positions of the joints of the links and rocking levers may be adjusted to compensate the inequality. If the stroke of the bar A be made equal to one-half of the stroke of the bar A', then the joints between the links and rocking levers will be equidistant from the center of the shaft D, about which the rocking levers oscillate.

Figure 5:
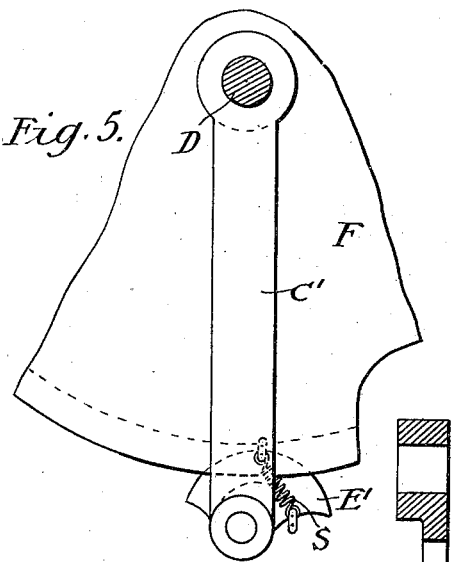
Figure 6:
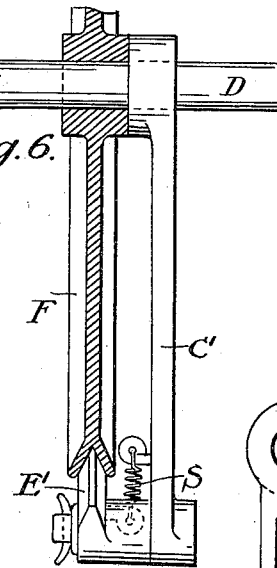

As the eccentric wedges E' and E³ are required to act in an upward direction means must be provided to keep them in gear with their respective grooves. Means of doing so are shown in Figs. 5, 6, 7, and 8. Figs. 5 and 6 show a spiral spring S, working in tension, one end being attached to the eccentric wedge E' and the other end to the rocking lever C'. In the modification shown in Figs. 7 and 8 the eccentric wedge E' is overbalanced and kept in gear with its groove by the counterpoise T. It is, however, to be distinctly understood that I do not confine myself to these two means of keeping the upward-acting eccentric wedges in gear with their respective grooves. Other suitable means may be employed. The devices may be applied also to the upper wedges.

Figure 9:
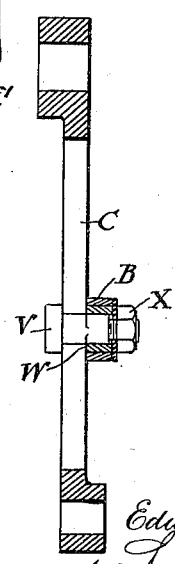
Figure 10:
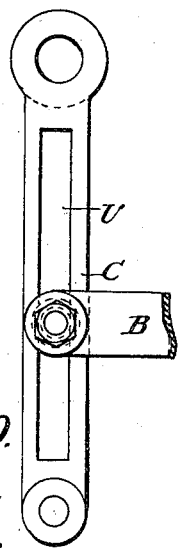

Figs. 9, 10, 11, and 12 show means of adjusting the joints of the links and rocking levers. Referring to Figs. 9 and 10, B is the link and C is the rocking lever, in which is formed the slot U. The pin V is formed with a square shoulder fitting in the slot U. Fitting upon the turned portion of the pin is the collar or bush W, upon which is placed the link B. The bush or collar W is slightly longer than the thickness of the link B and larger in diameter than the width of the slot U. The rocking lever C is gripped between the collar W and the head of the pin V by screwing up the nut X; but the length of the collar W being slightly in excess of the thickness of the link B the link B is left free to move on the collar W. The same description will apply to the modification shown in Figs. 11 and 12, excepting that the position of the pin V, and consequently the joint or hinge, is altered by the screw Y, which works in a threaded hole in the squared portion of the pin V.

Fig. 4 shows a section through an alternative arrangement of the epicyclic train, in which spur-wheels L' K' are substituted for the miter-wheels L K. (Shown in Figs. 1, 2, and 3.) In this arrangement the wheels K' and L' are of the same diameters, and the wheels M² and M³ are also of equal diameters, but not necessarily of the same diameter as the wheels K' and L'. The wheels M² and M³ are keyed or otherwise secured upon a spindle or shaft $m^2$, passing through the outer end of the arm H'. M² gears with K' and M³ with L'. In all other respects the description relating to Figs. 1, 2, and 3 will apply in regard to this arrangement.

Figs. 13 and 14 show an alternative for the eccentric wedge and grooved wheel or other equivalent of the click and ratchet with an infinite number of teeth. In this arrangement the wheel 1 is surrounded by two loose rings or straps 2 and 3. To projections on these rings are pivoted the nipping-levers 4 and 5. One end of the nipping-lever projects and fits upon the rim of the wheel. The other end, by means of a pin or stud, engages with a rocking lever—4 with C and 5 with C'. When the bar A is moved forward the rocking lever C forces over the nipping-lever 4 and grips the wheel 1 between the projecting end of the nipping-lever 4 and the ring or strap 2. At the same time the rocking lever C' lifts the projecting end of the nipping-lever 5 away from the wheel and allows the wheel to revolve with the ring or strap 3. When the bar A moves backward the nipping-lever 5 and ring 3 grip the wheel and 2 and 4 are loose. The nipping-levers 4 and 5 are set so as to turn the wheel always in the same direction.

Having now particularly described and ascertained the nature of my said invention and in what manner the same is to be performed, I declare that what I claim is—

1. In a distance-recording apparatus for reciprocating bodies, the combination with a frame, a shaft and bearings therefor in said frame, of wheels on said shaft, means in connection with the reciprocating bodies whereby said wheels are rotated, a gear-wheel free on said shaft, and an epicyclic train of gears whereby motion is transmitted from the said wheels to the said gear-wheel, substantially as and for the purposes set forth.

2. In a distance-recording apparatus for reciprocating bodies, the combination with a frame, a shaft and bearings therefor in said frame, of wheels on said shaft, means in connection with the reciprocating bodies whereby said wheels are rotated, a gear-wheel free on said shaft and means for transmitting motion from the said wheels to the said gear-wheel so that the revolutions imparted to the said gear-wheel in a given time are proportional to the sum of the revolutions of the said wheels in the same time, substantially as set forth.

3. In a distance-recording apparatus for reciprocating bodies, the combination with a frame, a shaft and bearings therefor in the said frame, of grooved wheels on said shaft, means in connection with the reciprocating bodies for actuating said grooved wheels in opposite directions, a gear-wheel free on said shaft, and an epicyclic train of gears between one of said grooved wheels and said gear-wheel the parts being so connected together and to the said shaft that the said gear-wheel in a given time is caused to revolve proportionally to the sum of the revolutions of the said grooved wheels in the same time, substantially as specified.

4. In a distance-recording apparatus for reciprocating bodies, the combination with a frame, a shaft and bearings therefor in said frame, of two grooved wheels on said shaft one free thereon and the other keyed thereto, a bevel-gear integral with the free grooved wheel, means in connection with the reciprocating bodies for revolving said grooved wheels, a gear-wheel free on said shaft, a bevel-gear integral therewith, a hub connected to said shaft, and bevel-gears carried by said hub and meshing with the said gears integral respectively with the said gear-wheel and the grooved wheel free on the shaft, whereby motion may be transmitted from the said grooved wheels to the said gear-wheel, substantially as specified.

5. In a distance-recording apparatus for reciprocating bodies, the combination with a frame, shaft and bearings therefor, of a grooved wheel free on said shaft, a grooved wheel fixed on said shaft, a gear-wheel free on said shaft, an epicyclic train of gears between said gear-wheel and the free grooved wheel, rods connected to the reciprocating bodies, rocker-arms on said shaft having longitudinal slots therein, links connecting said rods and said rocker-arms, means for varying the movement of the rocker-arms for a given stroke, and means carried by the said rocker-arms for imparting motion to the said grooved wheels and thence through the epicyclic train to the gear-wheel, substantially as specified.

6. In a distance-recording apparatus for reciprocating bodies, the combination with a frame, shaft and bearings therefor, of a grooved wheel free on said shaft, a grooved wheel fixed on said shaft, a gear-wheel free on said shaft, an epicyclic train of gears between said gear-wheel and the free grooved wheel, rods connected to the reciprocating bodies, rocker-arms on said shaft having longitudinal slots therein, links connecting said rods and said rocker-arms, bolts passing through the slots in the said rocker-arms, collars on said bolts over which the ends of the said links fit, and means carried by said rocker-arms for imparting motion to the said grooved wheels in opposite directions to operate the gear-wheel, substantially as specified.

7. In a distance-recording apparatus for reciprocating bodies, the combination with a frame, shaft and bearings therefor, of a grooved wheel free on said shaft, a grooved wheel fixed on said shaft, a gear-wheel free on said shaft, an epicyclic train of gears between said gear-wheel and the free grooved wheel, rods connected to the reciprocating bodies, rocker-arms on said shaft having longitudinal slots therein, links connecting said rods and said rocker-arms, bolts passing through the slots in the said rocker-arms, collars on said bolts over which the ends of the said links fit, and eccentric wedges carried by said rocker-arms and bearing in the grooves of said grooved wheels for imparting motion to the same to turn said gear-wheel, substantially as specified.

In testimony whereof I have signed my name to this specification in the presence of two subscribing witnesses.

EDWIN ATKINSON WHITEHEAD.

Witnesses:
F. H. HENCE,
W. R. THOMAS.